(12) United States Patent
Muntal Diaz et al.

(10) Patent No.: US 11,993,022 B2
(45) Date of Patent: May 28, 2024

(54) SEPARATION OF OBJECTS FOR ADDITIVE MANUFACTURING

(71) Applicant: Hewlett-Packard Development Company, L.P., Spring, TX (US)

(72) Inventors: Quim Muntal Diaz, Sant Cugat del Valles (ES); Jordi Sanroma Garrit, Sant Cugat del Valles (ES); Manuel Freire Garcia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/252,026

(22) PCT Filed: Mar. 29, 2019

(86) PCT No.: PCT/US2019/025060
§ 371 (c)(1),
(2) Date: Dec. 14, 2020

(87) PCT Pub. No.: WO2020/204899
PCT Pub. Date: Oct. 8, 2020

(65) Prior Publication Data
US 2022/0009171 A1 Jan. 13, 2022

(51) Int. Cl.
| | |
|---|---|
| *B29C 64/386* | (2017.01) |
| *B29C 64/182* | (2017.01) |
| *B33Y 50/00* | (2015.01) |
| *G05B 19/4099* | (2006.01) |
| *B29C 64/165* | (2017.01) |

(52) U.S. Cl.
CPC .......... *B29C 64/386* (2017.08); *B29C 64/182* (2017.08); *B33Y 50/00* (2014.12); *G05B 19/4099* (2013.01); *B29C 64/165* (2017.08); *G05B 2219/35134* (2013.01); *G05B 2219/49023* (2013.01)

(58) Field of Classification Search
CPC ... B29C 64/386; B29C 64/182; B29C 64/165; B33Y 50/00; B33Y 10/00; B33Y 50/02; G05B 19/4099; G05B 2219/35134; G05B 2219/49023; H04N 1/387
USPC .................................................... 700/98, 119
See application file for complete search history.

(56) References Cited

U.S. PATENT DOCUMENTS

| | | |
|---|---|---|
| 6,980,934 B1 | 12/2005 | Sadovnik |
| 8,845,319 B2 | 9/2014 | Oberhofer et al. |
| 8,868,230 B2 | 10/2014 | Tschanz et al. |
| 2011/0293771 A1 * | 12/2011 | Oberhofer ............. B29C 64/364 425/182 |

(Continued)

FOREIGN PATENT DOCUMENTS

| | | | | |
|---|---|---|---|---|
| WO | WO-2016010590 A1 | | 1/2016 | |
| WO | WO-2017023284 A1 * | | 2/2017 | ........... B29C 64/171 |
| WO | WO-2017196345 A1 * | | 11/2017 | ......... B29C 35/0288 |

*Primary Examiner* — Vincent H Tran
*Assistant Examiner* — Michael Tang
(74) *Attorney, Agent, or Firm* — Michael Dryja (57) ABSTRACT

In an example a tangible machine-readable medium stores instructions which, when executed by a processor, cause the processor to determine an object generation arrangement for additive manufacturing based on a separation distance between objects, wherein the separation distance varies based on an intended location of object generation.

20 Claims, 5 Drawing Sheets

(56) References Cited

U.S. PATENT DOCUMENTS

| | | | |
|---|---|---|---|
| 2014/0081603 A1* | 3/2014 | Griffith | G06F 30/20 |
| | | | 703/1 |
| 2015/0025124 A1 | 1/2015 | Herrmann et al. | |
| 2015/0251249 A1 | 9/2015 | Fager | |
| 2016/0246293 A1* | 8/2016 | Sakai | G05B 15/02 |
| 2017/0012918 A1 | 1/2017 | Green et al. | |
| 2017/0113414 A1* | 4/2017 | Zeng | B33Y 30/00 |
| 2017/0129184 A1 | 5/2017 | Buller et al. | |
| 2018/0024517 A1 | 1/2018 | Halperin | |
| 2018/0071986 A1* | 3/2018 | Buller | C22C 33/02 |
| 2018/0104912 A1 | 4/2018 | Bastian et al. | |
| 2018/0329658 A1 | 11/2018 | Collomp | |
| 2019/0378566 A1* | 12/2019 | Boniardi | H01L 45/085 |
| 2020/0041441 A1* | 2/2020 | Watanabe | G01N 27/41 |
| 2020/0055246 A1* | 2/2020 | Günther | B29C 64/165 |

\* cited by examiner

SEPARATION OF OBJECTS FOR ADDITIVE MANUFACTURING

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. Build material may be deposited, for example on a print bed and processed layer by layer, for example within a fabrication chamber. According to one example, a suitable build material may be PA12 build material commercially known as V1R10A "HP PA12" available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material to which fusing agent has been applied heats up/melts, coalesces and solidifies to form a slice of the three-dimensional object in accordance with the pattern. In other examples, coalescence may be achieved in some other manner.

In an example, a suitable fusing agent may be an ink-type formulation comprising carbon black, such as, for example, the fusing agent formulation commercially known as V1Q60A "HP fusing agent" available from HP Inc. In some examples, a fusing agent may comprise at least one of an infra-red light absorber, a near infra-red light absorber, a visible light absorber and a UV light absorber. Examples of print agents comprising visible light enhancers are dye based colored ink and pigment based colored ink, such as inks commercially known as CE039A and CE042A available from HP Inc.

In some examples, a print agent may comprise a detailing agent, or coalescence modifier agent, which acts to modify the effects of a fusing agent for example by reducing (e.g. by cooling) or increasing coalescence or to assist in producing a particular finish or appearance to an object. Detailing agent may also be used to control thermal aspects of a layer of build material—e.g. to provide cooling. In some examples, detailing agent may be used near edge surfaces of an object being printed. According to one example, a suitable detailing agent may be a formulation commercially known as V1Q61A "HP detailing agent" available from HP Inc. A coloring agent, for example comprising a dye or colorant, may in some examples be used as a fusing agent or a coalescence modifier agent, and/or as a print agent to provide a particular color for the object. Print agents may control or influence other physical or appearance properties, such as strength, resilience, conductivity, transparency, surface texture or the like.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices defined between parallel planes of the model. Each slice may define a portion of a respective layer of build material that is to be solidified or caused to coalesce by the additive manufacturing system.

In some examples, it may be intended to manufacture objects to a high dimensional accuracy.

Figure 1:
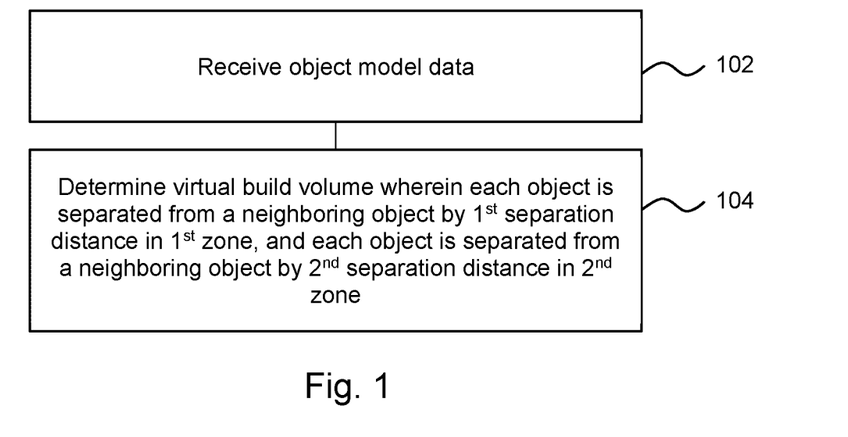
FIG. 1 is an example of a method of determining a virtual build volume for additive manufacturing.

FIG. 1 is an example of a method, which may comprise a computer implemented method and/or a method of determining arrangement of objects to be generated within a build volume (also referred to herein as a fabrication chamber) of an additive manufacturing apparatus. The arrangement may be referred to as a 'virtual build volume' as it models, or virtually represents, a possible placement of object(s) which may be generated in at least part of a build volume (or fabrication chamber) of an additive manufacturing apparatus.

Block 102 comprises receiving, by at least one processor, object model data. The object model data describes a plurality of objects to be generated in additive manufacturing. In some examples, the object model data may be received from a memory, over a network or the like. In some examples, the object model data may describe at least the geometry of objects to be generated, for example in the form of a vector model, a mesh model or a voxel model of the objects. In some examples, the object model data may describe intended object properties, such as color, strength, density and the like.

Block 104 comprises determining, by at least one processor (which may comprise the same processor(s) as performs block 102), a virtual build volume indicating a possible placement of a plurality of objects in object generation such that in a first predefined zone of the virtual build volume, each object is separated from a neighboring object by at least a first separation distance, and in a second predefined zone of the virtual build volume, each object is separated from a neighboring object by at least a second separation distance. The first and second separation distances may be predetermined or predefined.

The virtual build volume may indicate a possible placement and orientation of the plurality of objects in object generation. In other words, the virtual build volume models at least part of an actual build volume (or fabrication chamber) which could result after carrying out an additive manufacturing operation. For example, this may specify the placement of the objects within the build volume (for example, their location in three-dimensional space, which may be expressed using xyz coordinates relative to an origin, which may be defined as a corner of the build volume), and thereby the placement relative to other objects to be generated within the build volume in the same possible object generation operation. The orientation of the object(s) may also be specified. The orientation of an object during generation may be different to the intended orientation in use—for example, objects may be generated 'upside down', or on their sides or in some other way.

The separation distances may be defined to ensure that objects do not merge during object generation. In addition, in particular when additive manufacturing processes use or generate heat, objects may be separated to provide at least a degree of thermal isolation between objects. For example, where fusing agent is applied to a layer which is then heated, this may result in the portion of the built material which received fusing agent reaching a fusing temperature. However, when there is also heating from a nearby object, the temperature in an area around that to which the fusing agent is applied may also reach its fusing temperature, resulting in a deformity, often in the form of a 'bulge', being formed in the object.

The predefined first and second zones may be defined based on an associated tendency for objects generated to deviate from intended dimensions on object generation. In addition to the tendency for objects to grow or bulge as described above, in some examples, objects have been previously found to shrink, for example on cooling such that they are smaller than the originally intended dimensions. It has been noted that some zones of a fabrication chamber may be more prone to such deviations then others, and that such behaviour may be characterised. Therefore, in some examples the first and predefined zone may be associated with a first anticipated degree of deformation and the second predefined zone may be associated with a second (different) anticipated degree of deformation. For example, the zones may be characterised in testing of additive manufacturing apparatus (which may be a particular additive manufacturing apparatus, or class of additive manufacturing apparatus), for example by setting a threshold or range for deformation of an object to be associated with a particular zone within a fabrication chamber in order to define the spatial extent of the zone. For example, a first zone may be associated with regions of the fabrication chamber in which objects tend to grow by up to, for example, 1% in a particular dimension whereas a second zone may be associated with regions of the fabrication chamber in which objects tend to grow by between 1% and 2%. There may be further zones, for example a third zone may be associated with regions of the fabrication in which objects tend to shrink by up to 1%.

It will therefore be appreciated that such zones may have substantially arbitrary shapes, which may for example be defined based on experimentation or theoretical analysis of the zones within a fabrication chamber which are more likely to be associated with a higher degree of object deformation.

In other examples, the zones may be reserved for particular classes of objects. For example, specifying a greater separation distance may reduce the probability that an individual object undergoes deformation. Therefore, in some examples, different zones may be allocated to different objects, wherein zones associated with greater separations may be used for objects which a user associates with a high priority for accuracy. Therefore, objects placed within this zone may be guaranteed to have at least the greater separation, whereas objects in other zones of the fabrication chamber may be separated by a smaller separation.

The zones may be predefined using any or any combinations of such principles, or in some other way.

The method of FIG. 1 allows different object separations to be specified for different regions of a fabrication chamber. Viewed another way, the method of FIG. 1 allows a separation distance to be specified based on an intended location of objects generation. For example, a greater distance may be specified for object(s) which are to be generated in a zone associated with a relatively high degree and/or likelihood of object generation, and/or for object(s) identified as being associated with a high intended manufacturing accuracy. Viewed in one way, the predefined zones may be described as zones associated with different target packing densities for the objects to be generated therein.

By allowing some objects (e.g. those which are associated with a relatively low degree or likelihood of deformation, or those which are to be fabricated with a lower emphasis on dimensional accuracy) to be separated by a smaller distance, an increased packing density may be achieved. However, in another zone (e.g. a zone which are associated with a relatively high degree or likelihood of deformation, or those for which dimensional accuracy is considered to be of higher importance), increased separation distances may assist in reducing or preventing deformation associated with the proximity of a neighbor and/or object merger.

Figure 2:
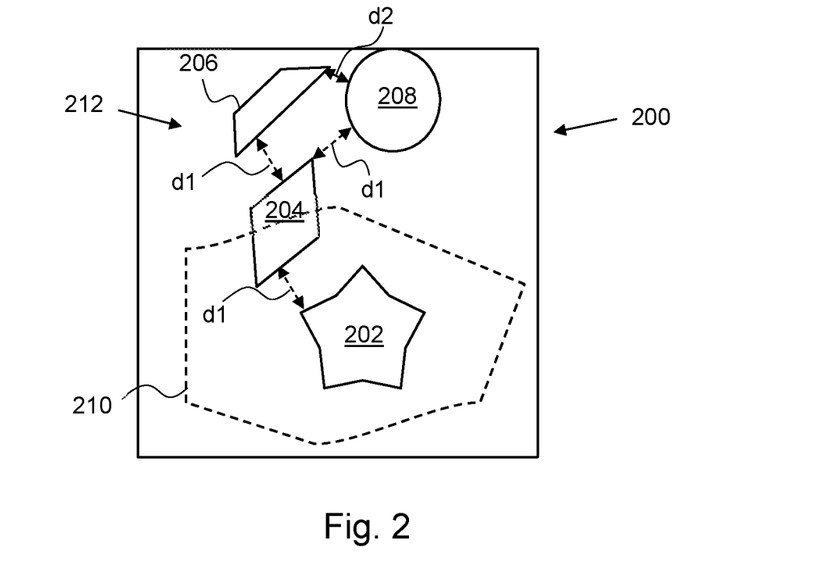
FIG. 2 is a schematic diagram of an example representation of a portion of a build volume indicating object placements.

FIG. 2 illustrates the principle in two dimensions. FIG. 2 shows a slice through a schematic representation virtual build volume 200 containing an arrangement of a plurality of objects 202, 204, 206, 208. A first object 202 is wholly within a first zone 210, for which a first separation distance d1 has been specified. A second object 204 is partially within the first zone 210 and partially within a second zone 212, for which a second separation distance d2 has been specified. In this example, the second zone 212 comprises any zone of the fabrication chamber which is outside the first zone 210, although in other examples, the second zone 212 (or any other zone) may have its own defined shape. The second and third objects 204, 206 are wholly within the second zone 212. In this example, d1 is greater than d2.

In this example, it has been determined that, if any object is at least partially in the first zone, that object should be separated from any neighbouring object by at least the first separation distance. Therefore, both the first and second objects 202, 204 are separated from their neighbours by at least d1, However, the second and third objects 206, 208 are wholly within the second zone 212, and therefore are mutually separated by the smaller separation distance, d2.

While in this example, the largest separation distance of any of the zones which an object is at least partially within is taken for that object as whole (and this may simplify determination of the virtual build volume in some methods of determining the virtual build volume, as is further set out below), this need not be the case in all examples. In some examples, a different separation distances may apply to different object sub-portions.

The method of FIG. 1 may be carried out to ensure that, while the first object 202 and the second object 204 may be separated from any other object by a relatively large distance d1, other objects may be separated by a relatively small distance d2. For example, d2 may be, for example, at least 0.5 mm, 1 mm, or 2 mm, whereas d1 may be a greater distance, for example, 2.5 mm to 6 mm. While the example of FIG. 2 demonstrates the principle in two dimensions and with two zones, the same principle may be applied in three dimensions and/or with more zones.

By applying the larger separation to selected zones, but not to all zones, a build volume as a whole may be more closely packed while maintaining an intended accuracy level.

Figure 3:
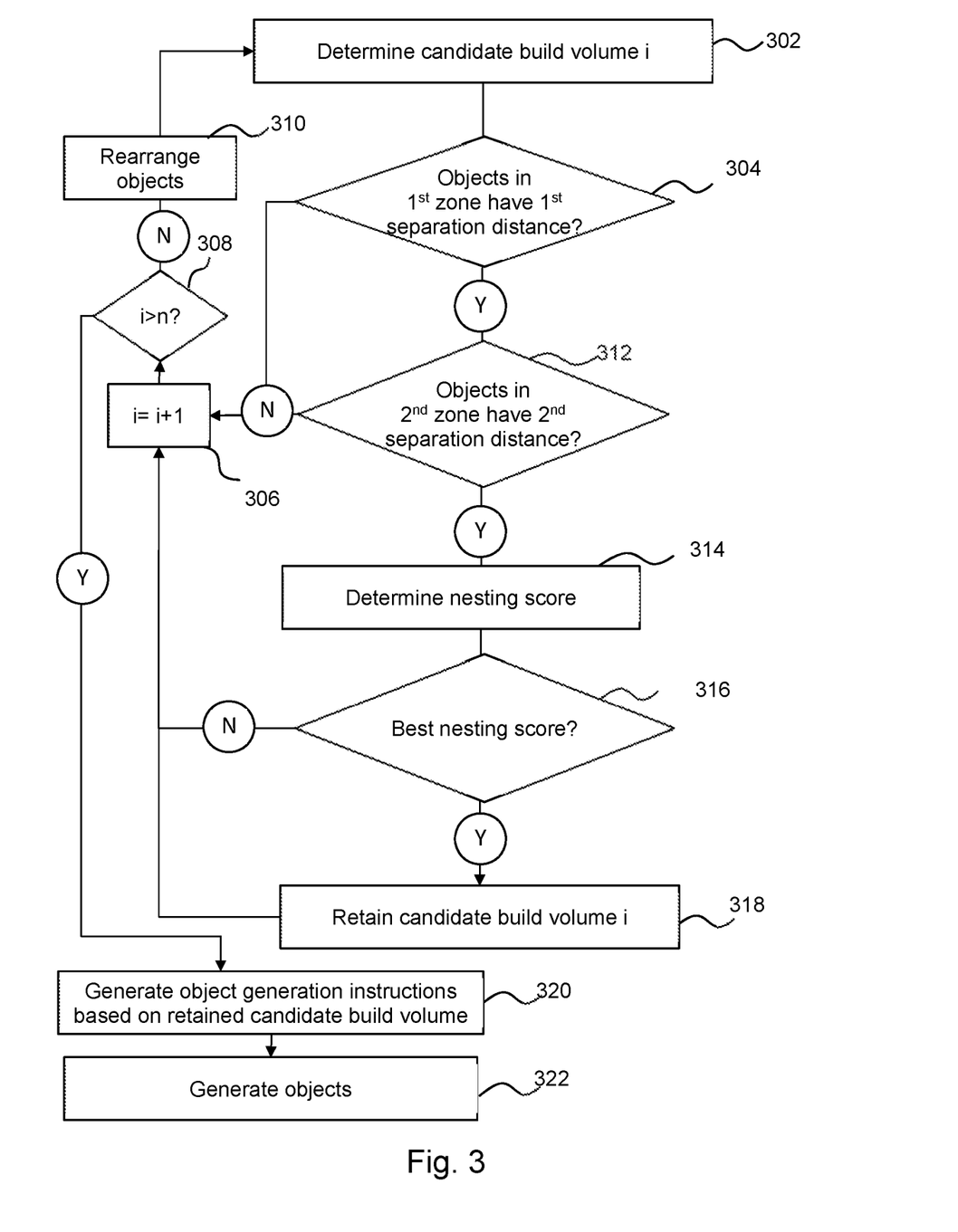
FIG. 3 is an example method of generating an object in additive manufacturing.

FIG. 3 shows an example method for determining the virtual build volume of FIG. 1, generating object generation instructions and, in turn, generating an object. The method, which may be implemented at least in part using at least one processor, comprises determining and evaluating a plurality of candidate virtual build volumes, such that the determined virtual build volume may be a selected one of the candidate virtual build volumes. These candidate virtual build volumes may for example comprise different arrangements of a set of objects, in which the objects have different placements and/or orientations of objects. In some examples, this may be a (or any) build volume which meets the criteria of FIG. 1 (i.e. the separation distances of the different zones are respected), although in this example, an object 'nesting density' is also considered.

Block 302 comprises determining a candidate virtual build volume having a particular arrangement of objects and a candidate virtual build volume index i=1. This may in some examples be a random arrangement of the objects, which may have been verified to ensure that the objects are fully contained within the bounds of the virtual build volume and/or that the objects do not insect. This may be determined from received object model data describing a plurality of objects to be generated in additive manufacturing. This may for example comprise object model data as described in relation to block 102 above.

Block 304 comprises evaluating, by at least one processor, the candidate virtual build volume, wherein the evaluation comprises evaluating if each object which is (in some examples, at least partially) within a first predefined zone of the virtual build volume is separated from a neighbouring object by at least a first separation distance. If not, the method proceeds to block 306, which comprises incrementing the index i. If it is determined in block 308 that the incremented index is less than a threshold number, the method proceeds to block 310 which comprises rearranging the objects, and method loops back to block 302 with the new arrangement. In other words, in this example, unless the candidate virtual build volume fulfils the separation criteria, it will fail inspection and be disregarded.

Block 310 may for example comprise "shuffling" the candidate virtual build volume, for example by applying a random rotation to object(s) (and in some examples, validating that the new object placement remains inside the printable volume and does not result in an intersection between objects). In some examples, there may be at least one condition placed on the re-arrangement of objects within the candidate virtual build volumes. For example, the rotations and translations applied when re-arranging the objects may be constrained. For example, rotations may be 90° rotations, or 45° rotations but before range of rotation angles may not be accessible. This may assist in reducing the search area in identifying a suitable virtual build volume from the candidate virtual build volumes.

If however the determination of block 304 is that the first separation distance is respected for objects within the first predefined zone, the method proceeds to block 312 which comprises evaluating if each object in a second predefined zone of the virtual build volume is separated from a neighbouring object by at least a second separation. If not, the method proceeds to blocks 306, such that (assuming the index i remains below the threshold as determined in block 308) a new arrangement is generated by rearranging the objects (block 310), and may be considered in a further iteration of the method. If however the second separation distance is respected for objects within the second predefined zone, the method proceeds to block 314, which comprises determining a nesting score.

The nesting score comprises an evaluation of the packing efficiency, i.e. how efficiently the space available in a build volume is utilized. For example, such a score may take account of the number of objects and the overall height of the occupied build volume as the lower the height of the build volume, the faster the build volume may be generated.

For example, a candidate virtual build volume may be assessed using an equation as set out below:

$$\text{candidate\_virtual\_build\_volume\_nesting\_score} = e^\rho * \left( \alpha * \frac{\sum_{i=0}^{n} Z_i}{n} + \beta * \frac{\max(Z)}{\vartheta} \right)$$

Where:
ρ=Number of objects which are omitted from candidate virtual build volume
Z=height of each object in the build volume, measured from the bottom of the build volume
ϑ=Usable height of build volume
α=Assigned importance of the average height
β=Assigned importance of the maximum height
n=number of objects The first term of the equation ($e^\rho$) seeks to optimize the number of objects in the build volume, and in this example, this is given the greatest weight in the output score by comparing the number of objects included with a target number of objects (with ρ being the difference). The bracketed portion of the equation ranges from 0 to 1 and takes into account different parameters that affects the 'goodness' of the object arrangement of the candidate virtual build volume, including the average height of the objects in the build volume, and the total height as a proportion of the usable height. A score of 0 indicates a 'perfect' packing.

Of course, this is just one example of an equation which could be used and, depending on the intended use case, the basis of an evaluation may change. For example, an evaluation may comprise evaluating object placement with respect to boundaries of the fabrication chamber, such that, for example, identifying that an object is placed close to a fabrication chamber boundary (which regions may be associated with poor thermal characteristics) may negatively impact an evaluation.

For example, candidate_virtual_build_volume_nesting_score as set out above may be evaluated with $\alpha$ and $\beta$ being selected, for example according to user priorities or default parameters.

In another example, a target function may be intended to produce a value between 1 and 0, where 1 or 0 represents a perfect score in which all objects are arranged such that height is minimized and a packing density is maximized. These different criteria may take different weights within the function depending on the priorities of a user, default parameters or the like. For the sake of a simple example, 50% of the value may represent the contribution from how close the height is to the minimum height and 50% may relate to the packing density. Other proportions may be selected in other examples. For example, where high-speed is the priority, more weight may be given to the height of the virtual build volume.

While in this example, if the objects do not meet the separation criteria, the build volume is disregarded altogether, in other examples, this may instead negatively impact the score of the candidate virtual build volume.

In such cases, a nesting score may be determined to converge on a selected candidate virtual build volume which seeks to minimize a target function for determine the nesting score which depends on parameters such as the height of the virtual build volume, the number of objects contained within the build volume and/or the density of packing.

In block 316, it is determined if the nesting score is better than a previous best nesting score. If the nesting score is not better than a previous best nesting score, the method returns to block 306, such that such that (assuming the index i remains below the threshold as determined in block 308) a new arrangement is generated by rearranging the objects (block 310), and may be considered in a further iteration of the method. If however the score is better than a previous best nesting score, the candidate virtual build volume is retained (block 318), and the method returns to block 306, such that such that (assuming the index i remains below the threshold as determined in block 308) a new arrangement is generated by rearranging the objects (block 310), and may be considered in a further iteration of the method.

When the threshold for the index i is reached, the method proceeds to block 320, and the retained virtual build volume when the threshold is reached is selected as the determined virtual build volume of block 104.

Block 320 comprises generating object generation instructions based on the retained virtual build volume. For example, generating object generation instructions may comprise determining 'slices' of the selected virtual build volume, and rasterizing these slices into pixels (or voxels, i.e. three-dimensional pixels). An amount of print agent (or no print agent) may be associated with each of the pixels/voxels. For example, if a pixel relates to a region of a build volume which is intended to solidify, the print instructions may be generated to specify that fusing agent should be applied to a corresponding region of build material in object generation. If however a pixel relates to a region of the build volume which is intended to remain unsolidified, then object generation instructions may be generated to specify that no agent, or a coalescence modifying agent such as a detailing agent, may be applied thereto. In addition, the amounts of such agents may be specified in the generated instructions and these amounts may be determined based on, for example, thermal considerations and the like. In other examples, object generation instructions may be generated in some other way, for example specifying direction of energy and/or placement of other agents such as curing or binding agents.

Block 322 comprises generating (or printing) the objects according to the generated object generation instructions. For example, the objects may be generated in a layer-wise manner. For example, this may comprise forming a layer of build material, applying print agents, for example through use of 'inkjet' liquid distribution technologies in locations specified in the object generation instructions for an object model slice corresponding to that layer, and using at least one print agent applicator, and applying energy, for example heat, to the layer. Some techniques allow for accurate placement of print agent on a build material, for example by using printheads operated according to inkjet principles of two dimensional printing to apply print agents, which in some examples may be controlled to apply print agents with a resolution of around 600 dpi, or 1200 dpi. A further layer of build material may then be formed and the process repeated, for example with the object generation instructions for the next slice. In other examples, other object generation techniques may be used.

In other words, in this example, a plurality of candidate virtual build volumes are determined and evaluated repeatedly until, for example, a predetermined criteria is reached. In the example of FIG. 3, the method was carried out until a certain number of evaluations were completed, at which point the best scoring candidate virtual build volume may be adopted as a selected build volume (i.e. the predetermined criteria was a predetermined number of evaluations). In other examples, another candidate virtual build volume which for example meets some other predetermined criteria may be selected. For example, a candidate virtual build volume having at least a threshold score, or being within a range of the best score (for example, in the upper quartile of scores, or some other range defined with reference to the scores), or within a predetermined numerical range of the best score, or the like. In some examples, the predetermined criteria may relates to a rate of change of the result of the evaluation. For example, the method may iterate until a rate of change of the evaluation output is lower than a predetermined threshold (or in other words, until new candidate virtual build volumes do not produce significant improvements over previously evaluated candidate virtual build volumes). Selection between evaluated candidate virtual build volumes may comprise selecting, in some examples automatically, the candidate virtual build volume based on a predetermined criteria (e.g. lowest or highest score, which may depend on the evaluation scheme used) or in some other way.

Figure 4:
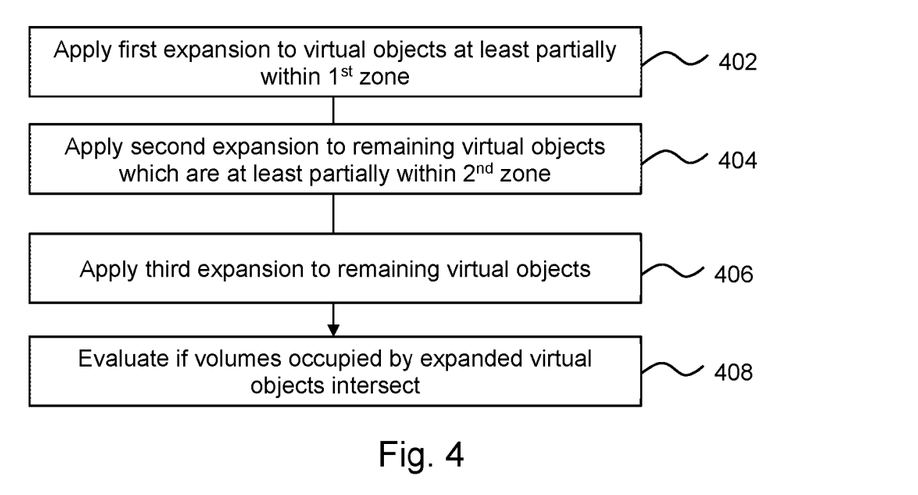
FIGS. 4 and 5 are example methods of evaluating candidate virtual build volumes.

FIG. 4 shows an example of a process which may be carried out to determine when separation criteria have been met. In this example, there are three zones, each associated with a progressively smaller defined separation (or a progressively higher packing density). The objects may be assigned to locations within a candidate virtual build volume.

Block 402 comprises modifying the object data in relation to at least one object by applying a first expansion (for example, an offset or dilation or scaling factor which enlarges the object portion) for objects which are to be generated at least partially within the first zone (or virtual objects which are at least partially within the first zone of the virtual build volume). Block 404 comprises applying a second expansion to remaining objects which are to be generated at least partially in the second zone (or virtual objects which are at least partially within the second zone of the virtual build volume). Block 406 comprises applying a third expansion to the remaining objects, which by definition will be wholly in a third predefined zone associated with a third minimum separation. In this example, the first expansion is half the first separation distance, the second expansion is half the second separation distance and the third expansion is half the third separation distance. In other words, the size of the expansion is determined based on the separation distance to be used when evaluating that object.

Block 408 comprises evaluating the candidate virtual build volume by determining if the virtual volumes occupied by virtual objects modelled by the modified object data intersect with one another. If an intersection is found, the candidate virtual build volume may fail inspection.

In other words, FIG. 4 is an example of a method of carrying out blocks 304 and 312 concurrently.

In other examples, a packing algorithm may be used to close pack the modified virtual objects (and/or to close-pack 'bounding boxes' enclosing the modified virtual objects with the smallest cuboid which full encloses the object). Such methods may be used to directly determine a virtual build volume in which the first and second separation distances (and any other specified separation distances) are respected.

The method is structured such that each virtual object is expanded by an amount associated with the zone occupied which has the highest specified separation (or the lower specified packing density). While it would be possible to treat the portions of each object which are in each zone separately (and this could result in a higher overall packing density), the method proposed in FIG. 4 is relatively simple compared to such an example.

In FIG. 4, expansions were applied to determine that the first, second and third separation distances were met. However, in other examples, other techniques may be used to carry out an evaluation. In another example, the minimum separation distance between each of a plurality of objects may be determined and compared to at least one of the first separation distance and the second separation distance. If the minimum determined separation distance is at least the applicable one of the first and second separation distance (or any other applicable separation distance), then it may be determined that the intended spacing has been observed.

In one such alternative, each object may be assessed in turn. Such an example is described in relation to FIG. 5, in which the objects are considered in turn using an object index j.

Figure 5:
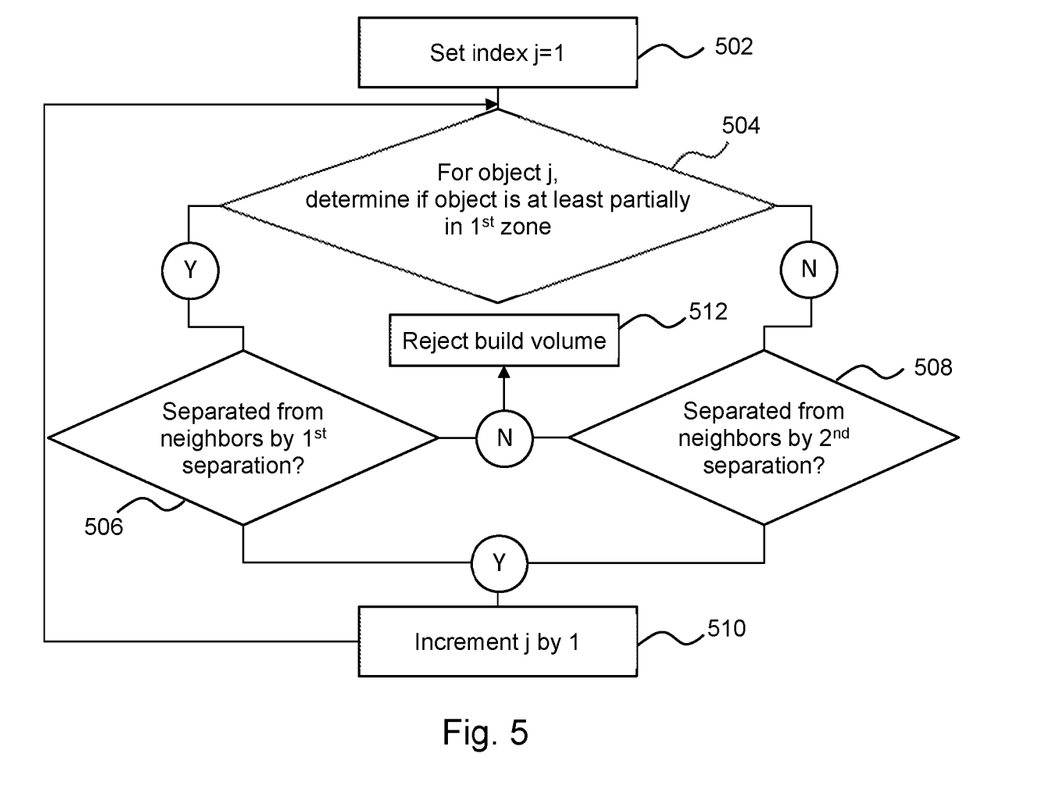

FIG. 5 comprises, in block 502, setting an index j to 1. Block 504 comprises, for an object j of a plurality of objects represented in a candidate virtual build volume, determining if that object is at least partially within the first predefined zone (which in this example is associated with the largest separation distance). If so, the method branches to block 506, which comprises evaluating if that object portion is separated from any neighboring object(s) by the first separation distance. If however the method is not at least partially within the first predefined zone, the method continues to block 508 which comprises determining if the object is separated from any neighboring object(s) by the second separation distance. In this example there are two defined zones.

The method then comprises block 510, which comprises incrementing the value of j by 1 and the method loops back to block 504 until all objects have been evaluated. If at any point a negative evaluation is determined, this may result in the candidate virtual build volume being rejected (block 512). In that case, the virtual build volume may be rearranged, and the method may start again.

If there are more than two defined zones, there may be further stages in the evaluation.

In some examples, this may be followed by determining a nesting score for candidate virtual build volumes in which applicable first and/or second object separations distances are respected.

Figure 6:
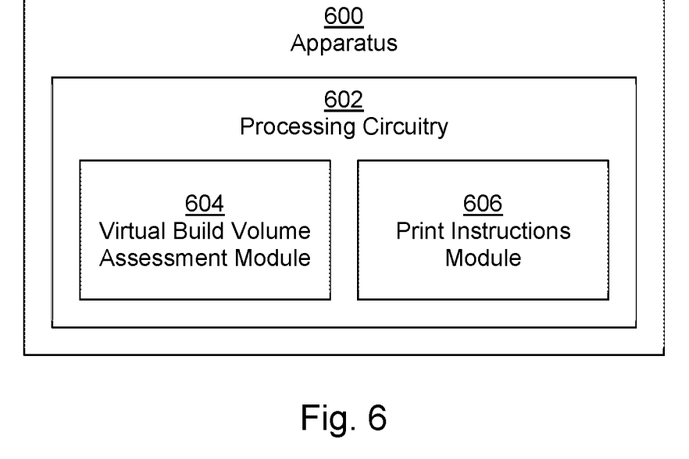
FIGS. 6 and 7 are examples of apparatus for use in additive manufacturing.

FIG. 6 shows an example of apparatus 600 comprising processing circuitry 602. The processing circuitry 602 comprises a virtual build volume assessment module 604 and a print instructions module 606.

In use of the apparatus 600, the virtual build volume assessment module 604 assesses a set of candidate virtual build volumes modelling possible fabrication chamber contents for generation of a plurality of objects based on an analysis of whether objects to be generated in a first portion of the fabrication chamber are separated by a first separation distance and objects to be generated in a second portion of the fabrication chamber are separated by a second separation distance, different to the first separation distance. The first and second portions of the fabrication chamber may be defined in a similar way to the predefined zones described above. For example, the assessment may be carried out as described for the evaluation in block in relation to the method of FIG. 3, 4 or 5. In some examples, first portion of the fabrication chamber is associated with greater thermal gradients (or otherwise associate with a greater degree or likelihood of object deformation) than the second portion of the fabrication chamber, and the first separation distance is greater than the second separation distance.

The print instructions module 606, in use of the apparatus 600, determines print instructions (or object generation instructions) for generating the object based on a virtual build volume of the set of candidate virtual build volumes which is selected following assessment by the virtual build volume assessment module 604. For example, the virtual build volume assessment module 604 may select a candidate virtual build volume which satisfies the minimum spacing specifications, and/or may score the candidate virtual build volumes and the best scoring candidate virtual build volume may be selected. For example, the virtual build volume assessment module 604 may assess (or analyze) the set of candidate virtual build volumes based on at least one of a height of each candidate virtual build volume and a number of objects in each candidate virtual build volume. In other words, in addition to taking into account whether the first and second separation distances are respected, other criteria may be assessed, for example as part of an optimization problem (or partial optimization problem) in evaluating a virtual build volume. In some examples, these may have associated relative influences on a function such that each can be given a relative importance. In other examples, print instructions may be generated in some other way.

Figure 7:
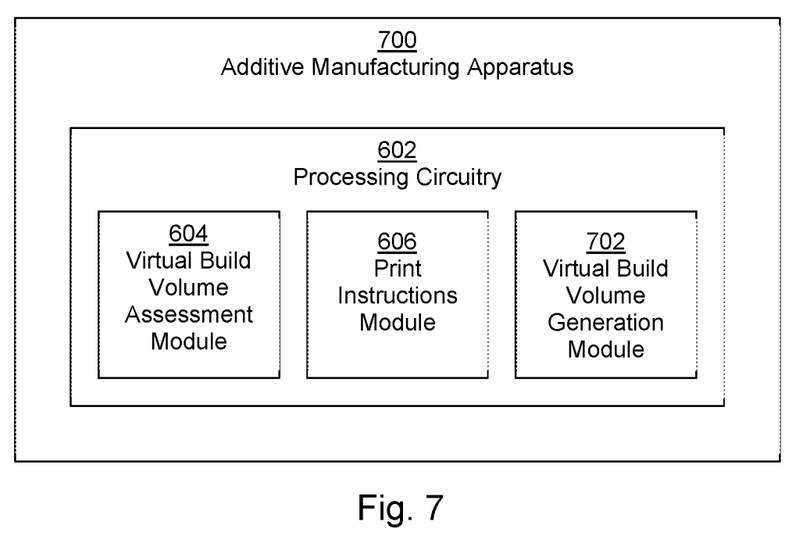

FIG. 7 shows an example of an additive manufacturing apparatus 700, which comprises the processing circuitry 602 of FIG. 6, which processing circuitry 602 further comprises, in this example, a virtual build volume generation module 702 to generate a set of candidate virtual build volumes by rearranging a set of virtual objects.

The additive manufacturing apparatus 700 may comprise additional apparatus for generating objects in additive manufacturing not shown herein. For example, the additive manufacturing apparatus 700 may comprise any or any combination of a fabrication chamber in which at least one object may be generated, a print bed, print agent applicator(s) such as printhead(s) for distributing print agents, a build material distribution system for providing layers of build material, energy sources such as heat lamps and the like, which are not described in detail herein.

The processing circuitry 602 of FIG. 6 or 7 may, in use of the apparatus 600, 700, carry out any or any combination of the blocks of FIG. 1, 4 or 5, or any of block 302 to 320 of FIG. 3.

Figure 8:
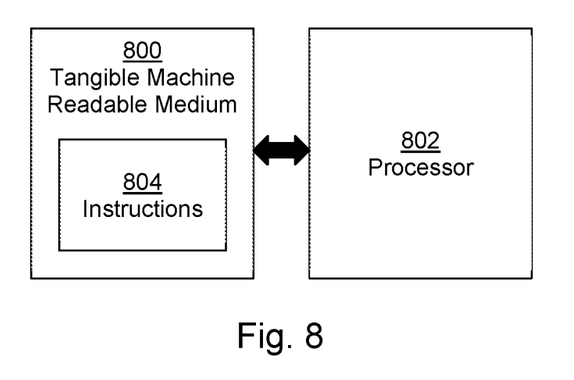
FIG. 8 is a simplified schematic diagram of a machine-readable medium in association with a processor, according to one example.

FIG. 8 shows an example of a tangible machine readable medium 800 in association with a processor 802. The machine readable medium 800 stores instructions 804 which, when executed, cause the processor 802 to carry out certain operations. In this example, the instructions 804 comprise instructions to cause the processor 802 to determine an object generation arrangement for additive manufacturing based on a separation distance between objects, wherein the separation distance varies based on the intended location of object generation. The intended location may be characterised as being at least partially within a predefined zone of the fabrication chamber, wherein the predefined zones may be associated with different target packing densities for the objects to be generated therein. The separation distance may be a minimum separation distance between the objects. In some examples, there may be a plurality of predetermined separation distances. In some examples, there may be a plurality of predetermined zones of the fabrication chamber, each of which may be associated with a different predetermined minimum separation distance.

The instructions 804 may, when executed, determine the object generation arrangement by evaluating plurality of possible object generation arrangements based on two or more separation distances, wherein the separation distances are associated with zones of an additive manufacturing fabrication chamber. The evaluation may comprise analyzing, for example scoring, the plurality of possible object generation arrangements.

In some such examples, the instructions 804 may cause the processor 802 to carry out any, or any combination, of the blocks of FIG. 1, 4 or 5, or any of block 302 to 320 of FIG. 3. For example, the possible object generation arrangements may be characterized as candidate virtual build volumes as described above.

In some examples, the instructions 804 may further comprise instructions to cause the processor 802 to generate possible object generation arrangements (e.g. candidate virtual build volumes). In some examples, as set out above, the instructions may apply rotation(s) (e.g. a predetermined number of rotations) to the objects to generate different object orientations, and/or translations to shift the intended locations of object(s) within a fabrication chamber.

In some examples, the instructions 804 may comprise instructions to cause the processor 802 to act as the virtual build volume assessment module 604, the print instructions module 606 and/or the virtual build volume generation module 702.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices (for example the virtual build volume assessment module 604, the print instructions module 606 and/or the virtual build volume generation module 702) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine-readable instructions may also be loaded onto a computer or other programmable data processing devices, so that the computer or other programmable data processing device(s) perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   receiving, by a processor, specification of a first zone and a second zone of a build volume of an additive manufacturing apparatus, the first zone and the second zone having been predefined in that objects additively manufactured in the first zone have to be separated from neighboring objects by at least a first separation distance and in that objects additively manufactured in the second zone have to be separated from neighboring objects by at least a second separation distance;

after the first zone and the second zone have already been predefined, generating, by the processor, a plurality of candidate arrangements of a plurality of specific objects to be additively manufactured within the build volume, each candidate arrangement specifying a position and an orientation of each specific object within the build volume, such that each candidate arrangement includes first objects of the plurality of objects in the first zone and second objects of the plurality of objects in the second zone, wherein definition of the first zone and the second zone is identical for each candidate arrangement and does not change when generating each candidate arrangement;

identifying, by the processor, a sub-plurality of the candidate arrangements in each of which all the first objects satisfy the first separation distance and in which all the second objects satisfy the second separation distance, such that in each of the candidate arrangements other than the sub-plurality, at least one of the first objects does not satisfy the first separation distance and/or at least one of the second objects does not satisfy the second separation distance;

selecting, by the processor, one of the identified sub-plurality of the candidate arrangements; and causing, by the processor, the additive manufacturing apparatus to additively manufacture the plurality of specific objects within the build volume in the candidate arrangement that has been selected.

2. The method according to claim 1, wherein the first zone is more restrictive than the second zone, and wherein any specific object that is partially in the first zone and partially in the second zone is considered to be in the first zone.

3. The method according to claim 1, wherein identifying the sub-plurality of the candidate arrangements comprises:

for each candidate arrangement, determining, by the processor, whether the first objects are each separated from neighboring objects by at least the first separation distance; and for each candidate arrangement in which the first objects have been determined as each being separated from neighboring objects by at least the first separation distance, determining, by the processor, whether the second objects are separated from neighboring objects by at least the second separation distance.

4. The method according to claim 1, further comprising:

for each candidate arrangement of the identified sub-plurality, determining, by the processor, a nesting score, wherein selecting the one of the identified sub-plurality of the candidate arrangements comprises selecting the candidate arrangement for which the nesting score is highest.

5. The method according to claim 4, wherein the nesting score is determined just for each candidate arrangement of the identified sub-plurality.

6. The method according to claim 1, wherein the first separation distance is predefined based on a first degree of object deformation that has been determined to occur within the first zone.

7. The method according to claim 6, wherein the second separation distance is predefined based on a second degree of object deformation that has been determined to occur within the second zone.

8. The method according to claim 1, further comprising:

generating, by the processor, object generation instructions based on the candidate arrangement that has been selected, wherein the causing the additive manufacturing apparatus to additively manufacture the plurality of specific objects within the build volume in the candidate arrangement that has been selected comprises causing the additive manufacturing apparatus to additively manufacture the plurality of specific objects using the object generation instructions.

9. A system comprising:

a processor; and a memory storing program code executable by the processor to:

receive specification of a first zone and a second zone of a build volume of an additive manufacturing apparatus, the first zone and the second zone having been predefined in that objects additively manufactured in the first zone have to be separated from neighboring objects by at least a first separation distance and in that objects additively manufactured in the second zone have to be separated from neighboring objects by at least a second separation distance;

after the first zone and the second zone have already been predefined, generate a plurality of candidate arrangements of a plurality of specific objects to be additively manufactured within the build volume, each candidate arrangement specifying a position and an orientation of each specific object within the build volume, such that each candidate arrangement includes first objects of the plurality of objects in the first zone and second objects of the plurality of objects in the second zone, wherein definition of the first zone and the second zone is identical for each candidate arrangement and does not change when generating each candidate arrangement;

identify a sub-plurality of the candidate arrangements in each of which all the first objects satisfy the first separation distance and in which all the second objects satisfy the second separation distance, such that in each of the candidate arrangements other than the sub-plurality, at least one of the first objects does not satisfy the first separation distance and/or at least one of the second objects does not satisfy the second separation distance;

select one of the identified sub-plurality of the candidate arrangements; and cause the additive manufacturing apparatus to additively manufacture the plurality of specific objects within the build volume in the candidate arrangement that has been selected.

10. The system according to claim 9, wherein the first zone is more restrictive than the second zone, and wherein any object that is partially in the first zone and partially in the second zone is considered to be in the first zone.

11. The system according to claim 9, wherein the program code is executable by the processor to identify the sub-plurality of the candidate arrangements by:

for each candidate arrangement, determining whether the first objects are each separated from neighboring objects by at least the first separation distance; and for each candidate arrangement in which the first objects have been determined as each being separated from neighboring objects by at least the first separation distance, determining whether the second objects are separated from neighboring objects by at least the second separation distance.

12. The system according to claim 9, wherein the program code is executable by the processor to further:
for each candidate arrangement of the identified sub-plurality, determine a nesting score,
wherein the one of the identified sub-plurality of the candidate arrangements that is selected is the candidate arrangement for which the nesting score is highest.

13. The system according to claim 12, wherein the nesting score is determined just for each candidate arrangement in which the first objects have been determined as each being separated from neighboring objects by at least the first separation distance and in which the second objects have been determined as each being separated from neighboring objects by at least the second separation distance.

14. The system according to claim 9, wherein the first separation distance is predefined based on a first degree of object deformation that has been determined to occur within the first zone.

15. The system according to claim 14, wherein the second separation distance is predefined based on a second degree of object deformation that has been determined to occur within the second zone.

16. The system according to claim 9, wherein the program code is executable by the processor to further:
generate object generation instructions based on the candidate arrangement that has been selected,
wherein the additive manufacturing apparatus is caused to additively manufacture the plurality of specific objects within the build volume in the candidate arrangement that has been selected by causing the additive manufacturing apparatus to additively manufacture the plurality of specific objects using the object generation instructions.

17. The system according to claim 9, further comprising the additive manufacturing apparatus.

18. The system according to claim 9, wherein the processor and memory are part of a device different than the additive manufacturing apparatus.

19. A non-transitory computer-readable data storage medium storing program code executable by a processor to perform processing comprising:
receiving specification of a first zone and a second zone of a build volume of an additive manufacturing apparatus, the first zone and the second zone having been predefined in that objects additively manufactured in the first zone have to be separated from neighboring objects by at least a first separation distance and in that objects additively manufactured in the second zone have to be separated from neighboring objects by at least a second separation distance;
after the first zone and the second zone have already been predefined, generating a plurality of candidate arrangements of a plurality of specific objects to be additively manufactured within the build volume, each candidate arrangement specifying a position and an orientation of each specific object within the build volume, such that each candidate arrangement includes first objects of the plurality of objects in the first zone and second objects of the plurality of objects in the second zone, wherein definition of the first zone and the second zone is identical for each candidate arrangement and does not change when generating each candidate arrangement;
identifying a sub-plurality of the candidate arrangements in each of which all the first objects satisfy the first separation distance and in which all the second objects satisfy the second separation distance, such that in each of the candidate arrangements other than the sub-plurality, at least one of the first objects does not satisfy the first separation distance and/or at least one of the second objects does not satisfy the second separation distance;
selecting one of the identified sub-plurality of the candidate arrangements; and
causing the additive manufacturing apparatus to additively manufacture the plurality of specific objects within the build volume in the candidate arrangement that has been selected.

20. The non-transitory computer-readable data storage medium according to claim 19, wherein the first separation distance is predefined based on a first degree of object deformation that has been determined to occur within the first zone upon additive manufacture of the first objects,
and wherein the second separation distance is predefined based on a second degree of object deformation that has been determined to occur within the second zone upon additive manufacture of the second objects.

\* \* \* \* \*